(No Model.) 2 Sheets—Sheet 1.

N. B. OUSLEY.

SULKY PLOW CARRIAGE.

No. 545,525. Patented Sept. 3, 1895.

Inventor

Newdaygate B. Ousley,

Witnesses

John C. Shaw

D. P. Wolhaupter

By his Attorneys,

C. A. Snow & Co.

(No Model.)

2 Sheets—Sheet 2.

N. B. OUSLEY.

SULKY PLOW CARRIAGE.

No. 545,525.

Patented Sept. 3, 1895.

Inventor

Newdaygate B. Ousley,

By his Attorneys.

C. A. Snow & Co.

Witnesses

John C. Shaw.

D. P. Wolhaupter.

United States Patent Office.

NEWDAYGATE B. OUSLEY, OF POULAN, GEORGIA, ASSIGNOR TO ROBERT N. OUSLEY AND JOHN N. OUSLEY, OF SAME PLACE.

SULKY-PLOW CARRIAGE.

SPECIFICATION forming part of Letters Patent No. 545,525, dated September 3, 1895.

Application filed October 26, 1894. Serial No. 527,047. (No model.)

*To all whom it may concern:*

Be it known that I, NEWDAYGATE B. OUSLEY, a citizen of the United States, residing at Poulan, in the county of Worth and State of Georgia, have invented a new and useful Sulky-Plow Carriage, of which the following is a specification.

This invention relates to sulky-plows; and it has for its object to provide a new and useful construction of carriage for sulky-plows, whereby the use of an axletree is dispensed with.

To this end therefore the main and primary object of the present invention is to provide an axletreeless sulky-plow having simple and efficient means whereby the driver can guide the plows out of the direct line of draft independently of the pull of the horses, thereby providing means for plowing curved or crooked rows, clearing obstacles in the row being plowed, and also providing means whereby the plows can be run out to the very end of the rows and easily and quickly turned around without running over growing crops.

With these and other objects in view, which will readily appear as the nature of the invention is better understood, the same consists in the novel construction, combination, and arrangement of parts hereinafter more fully described, illustrated, and claimed.

Figure 1:
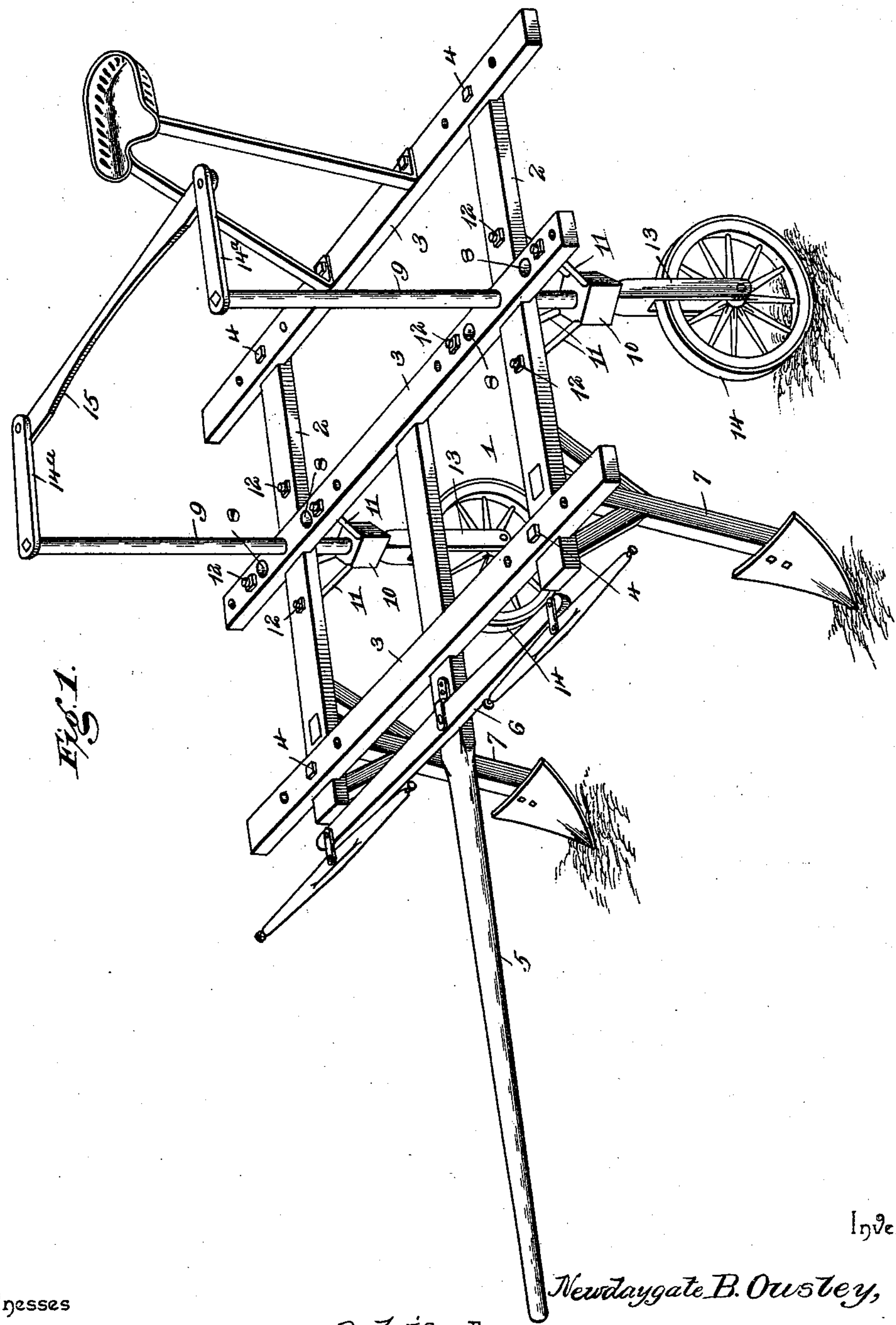
Figure 2:
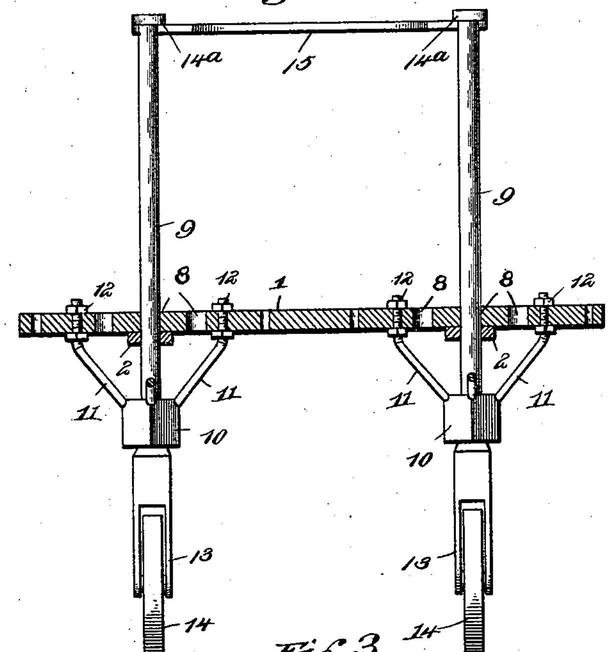
Figure 3:
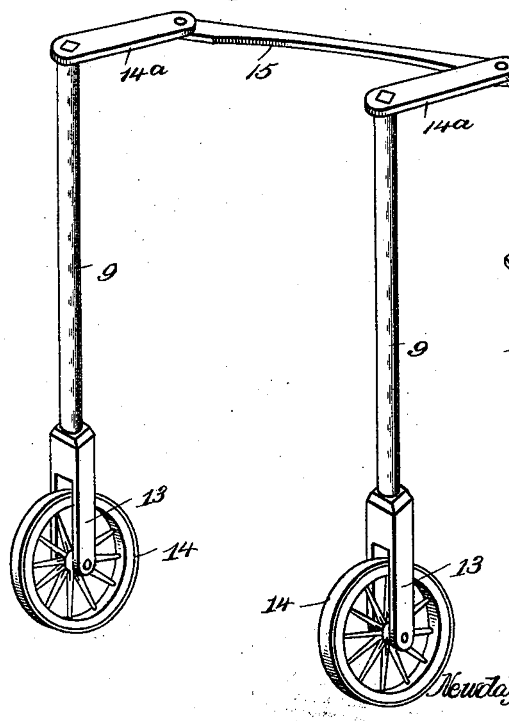
Figure 4:
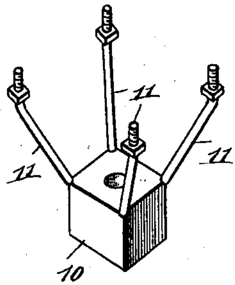

In the drawings, Figure 1 is a perspective view of a sulky-plow carriage constructed in accordance with this invention. Fig. 2 is a vertical transverse sectional view thereof. Fig. 3 is a detail in perspective of the connected vertical wheel-shafts and the wheels carried thereby shown separated from the carriage-body. Fig. 4 is a similar view of one of the suspended bearing-collars with the hanger-rods therefor attached.

Referring to the accompanying drawings, 1 designates a carriage-body of a sulky-plow essentially comprising the opposite parallel side bars 2, and a series of transverse cross-bars 3, detachably bolted to the side bars by means of suitable bolts 4, providing means whereby the several parts of the body can be easily taken apart and assembled or adjusted together to provide a body of suitable width for the work required of the plow. The said carriage-body 1 has connected to the front end thereof an ordinary draft-pole 5, at the inner end of which is located the usual doubletree 6, to provide for hitching the horses to the carriage, and the construction of carriage contemplated by the present invention provides for the disposition of the plows as near to the draft animals as they can be worked, so that the plows can be worked out to the end of the rows being plowed, and therefore the plows 7 are suitably attached to the front end of the carriage 1, substantially at the point where the doubletree is connected thereto. The said plows 7 may be of any approved construction and may be arranged in any suitable manner, according to the character of the work required of the plow.

One of the cross-bars 3 at a point intermediate of the front and rear ends of the carriage-body is provided at both sides of its center with a series of bearing-openings 8, in which are designed to work the oppositely-located vertical wheel-shafts 9 for the carriage-body, and said cross-bar having the bearing-openings therein may therefore be properly termed a bearing cross-bar for the opposite vertical wheel-shafts 9. By reason of providing a series of the bearing-openings 8 in groups at both sides of the center of the bearing cross-bar it will be obvious that the said vertical wheel-shafts may be mounted adjustably in the carriage body at any required distance apart, according to the arrangement of the plows in front of the shafts or other requirements, as will be obvious. The opposite adjustable vertical wheel-shafts 9 are also supported properly in position by means of the suspended under bearing-collars 10 that are arranged below the carriage-body 1, directly under and in alignment with the bearing-openings in which the shafts are mounted to turn, and said bearing-collars have connected thereto the lower ends of a series of diverging hanger-rods 11 that are suitably bolted at their upper ends, as at 12, to the carriage-body. The said hanger-rods are bolted to the bearing cross-bar and to the side bars 2, which, it will be understood, are adjusted to a position under the bearing-openings in which the shafts 9 are mounted to turn.

The vertical wheel-shafts 9 are provided at their lower ends with bearing-forks 13, in which are journaled the guide-wheels 14 that travel on the ground in rear of the plows, and the upper ends of said wheel-shafts above the carriage-body have connected thereto one end of the offstanding shaft-arms 14ª, to the other ends of which are connected the opposite ends of the intermediate connecting-bar 15, that is located conveniently within the reach of the driver, so that by grasping the same and moving it toward either side of the carriage-body, the wheel-shafts 9 will be turned simultaneously in their bearings to provide for turning the wheels 14 in and out of the line of draft, according to the manner in which it is desired to guide the plow to secure the results hereinbefore referred to.

Changes in the form, proportion, and the minor details of construction may be resorted to without departing from the principle or sacrificing any of the advantages of this invention.

Having thus described the invention, what is claimed, and desired to be secured by Letters Patent, is—

In a sulky plow, the combination of the skeleton carriage body having opposite laterally-adjustable side bars and an intermediately located transverse bearing-bar, intersecting the side bars at right angles thereto said bearing-bar being provided with a series of bearing-openings at both sides of its center, bearing collars arranged in a fixed position below said adjustable side bars and adapted to align with one of the bearing-openings in the bearing-bar, a series of hanger rods connected at their lower ends to said bearing collars and detachably bolted at their upper ends to the side bars and to said bearing bar, opposite parallel vertical wheel shafts mounted in the bearing collars and the bearing-openings directly above said collars, said shafts extending above and below the carriage body and carrying at their lower ends guide wheels, offstanding shaft arms connected at one end to the upper ends of the shafts above the carriage body, and a single connecting bar connecting the other ends of said shaft arms to provide for the simultaneous adjustment of both shafts, substantially as specified.

In testimony that I claim the foregoing as my own I have hereto affixed my signature in the presence of two witnesses.

NEWDAYGATE B. OUSLEY.

Witnesses:
J. W. PRICE,
J. S. SHINGLER.